(12) United States Patent
Chakraborty et al.

(10) Patent No.: US 8,103,316 B2
(45) Date of Patent: Jan. 24, 2012

(54) POWER MANAGEMENT SYSTEM FOR A FIELD DEVICE ON A WIRELESS NETWORK

(75) Inventors: Swapan Chakraborty, Eden Prairie, MN (US); Kelly M. Orth, Apple Valley, MN (US)

(73) Assignee: Rosemount Inc., Eden Prairie, MN (US)

( * ) Notice: Subject to any disclaimer, the term of this patent is extended or adjusted under 35 U.S.C. 154(b) by 930 days.

(21) Appl. No.: 11/881,041

(22) Filed: Jul. 25, 2007

(65) Prior Publication Data

US 2008/0081676 A1 Apr. 3, 2008

Related U.S. Application Data

(60) Provisional application No. 60/848,262, filed on Sep. 29, 2006.

(51) Int. Cl.
*H04B 1/38* (2006.01)
*H04M 1/00* (2006.01)

(52) U.S. Cl. ........................................ 455/574; 455/572

(58) Field of Classification Search .................. 455/572, 455/574, 127.1, 0.5, 343.1–343.2, 423, 67.11; 323/234; 370/311
See application file for complete search history.

(56) References Cited

U.S. PATENT DOCUMENTS

| 7,392,061 B2 * | 6/2008 | Hurwitz et al. ............. 455/552.1 |
| 2001/0005686 A1 * | 6/2001 | Naito et al. .................... 455/574 |
| 2001/0044332 A1 * | 11/2001 | Yamada et al. ............... 455/574 |
| 2002/0065631 A1 | 5/2002 | Loechner |
| 2005/0201349 A1 | 9/2005 | Budampati |
| 2005/0281215 A1 | 12/2005 | Budampati et al. |
| 2005/0289276 A1 | 12/2005 | Karschnia et al. |
| 2006/0002368 A1 | 1/2006 | Budampati et al. |
| 2006/0100002 A1 * | 5/2006 | Luebke et al. ................. 455/574 |
| 2006/0227729 A1 | 10/2006 | Budampati et al. |
| 2006/0274644 A1 | 12/2006 | Budampati et al. |
| 2006/0274671 A1 | 12/2006 | Budampati et al. |
| 2006/0287001 A1 | 12/2006 | Budampati et al. |
| 2007/0030816 A1 | 2/2007 | Kolavennu |
| 2007/0030832 A1 | 2/2007 | Gonia et al. |

FOREIGN PATENT DOCUMENTS

WO WO03023536 A1 3/2003

* cited by examiner

*Primary Examiner* — George Eng
*Assistant Examiner* — Marcos Torres
(74) *Attorney, Agent, or Firm* — Kinney & Lange, P.A.

(57) ABSTRACT

A field device includes a power control module, a network interface module that communicates over a wireless network, and a device interface module for operating transducers, such as a sensor or an actuator. The power control module controls distribution of electrical power so that the network interface module receives electrical power while it is attempting to join the wireless network. Once the network interface module has joined the wireless network, the power control module allows the network interface module and the device interface module to share electrical power.

23 Claims, 3 Drawing Sheets

POWER MANAGEMENT SYSTEM FOR A FIELD DEVICE ON A WIRELESS NETWORK

CROSS-REFERENCE TO RELATED APPLICATION

This application claims priority from provisional application Ser. No. 60/848,262 filed Sep. 29, 2006, which is incorporated by reference.

BACKGROUND OF THE INVENTION

The present invention relates to devices that communicate over a wireless mesh network. In particular, the present invention relates to power management in devices operating on wireless mesh networks.

Wireless data communication and control will be a dominant player in future sensor automation, process control, security, and safety regulation. One of the important requirements for wireless data communication and control is that the devices communicating over the network minimize their power consumption.

In wireless mesh network systems designed for low power, sensor/actuator-based applications, many devices in the network must be powered by long-life batteries or by low power energy-scavenging power sources. Power outlets, such as 120 VAC utilities, are typically not located nearby or may not be allowed into the hazardous areas where the instrumentation (sensors) and actuators must be located without incurring great installation expense. The need for low installation cost drives the need for battery-powered devices communicating as part of a wireless mesh network. Effective utilization of a limited power source, such as a primary cell battery which cannot be recharged, is vital for a well functioning wireless device. Batteries are expected to last more than 5 years and preferably as long as the life of the product.

In a true wireless mesh network, which may also be referred to as a self-organizing multi-hop network, each device must be capable of routing messages for itself as well as other devices in the network. The concept of messages hopping from node to node through the network is beneficial because lower power RF radios can be used, and yet the mesh network can span a significant physical area delivering messages from one end to the other. High power radios are not needed in a mesh network, in contrast a point-to-point system which employs remote devices talking directly to a centralized base-station.

A mesh network protocol allows for the formation of alternate paths for messaging between devices and between devices and a data collector, or a bridge or gateway to some higher level higher-speed data bus. Having alternate, redundant paths for wireless messages enhances data reliability by ensuring there is at least one alternate path for messages to flow even if another path gets blocked or degrades due to environmental influences or due to interference.

Some mesh network protocols are deterministically routed such that every device has an assigned parent and at least one alternate parent. In the hierarchy of the mesh network, much as in a human family, parents have children, children have grandchildren, and so on. Each device (or "node") relays the messages for their descendants through the network to some final destination such as a gateway. The parenting devices may be battery-powered or limited-energy powered devices. The more descendants a node has, the more traffic it must route, which in turn directly increases its own power consumption and diminishes its battery life.

In order to save power, some protocols limit the amount of traffic any node can handle during any period of time by only turning on the radios of the nodes for limited amounts of time to listen for messages. Thus, to reduce average power, the protocol may allow duty-cycling of the radios between On and Off states. Some protocols use a global duty cycle to save power such that the entire network is On and Off at the same time. Other protocols (e.g. TDMA-based) use a local duty cycle where only the communicating pair of nodes that are linked together are scheduled to turn On and Off in a synchronized fashion at predetermined times. Typically, the link is pre-determined by assigning the pair of nodes a specific time slot for communications, an RF frequency channel to be used by the radios, who is to be receiving (Rx), and who is to be transmitting (Tx) at that moment in time.

Mesh networks use a process known as "joining" to incorporate new devices into the secured network. During the joining process, a number of information exchanges and configurations take place.

The new device may scan through all available network channels or may use a predetermined channel or subset of channels to discover similar devices within radio range. The new device searches for the existing network nodes the new device has available to it in order to gain membership into the network. The presence of each device within earshot is recorded. The new device sends a message to establish a handshake protocol with a neighbor device, asks to join the network, and provides a device number and network ID. The neighbor communicates the request to a network manager, which for example may be a software program running on a network gateway or a server connected to the gateway. The new device will provide its "neighbor" list to the network manager so that the network manager can determine the links that must be established to allow the new device to participate in the network.

The new preferably device uses its pre-configured security information to decode a joining message from the network manager and sends back the expected security response along with other information necessary for the network manager to establish links from the new device to other devices in the network.

The new device and its new parents and children receive and implement configuration information from the network manager to establish the required links. The new device is then fully joined and participating in the network.

In most networks, the joining process described above happens only when new devices join the network. The process may take 15 to 20 minutes depending on the network activity in the neighborhood of the new device.

BRIEF SUMMARY

A field device capable of wireless data communication includes a network interface module for communicating over a wireless network and a device interface module for operating a transducer such as a sensor or an actuator. Distribution of electrical power to the network interface module and the device interface module is controlled by a power control module. The power control module allocates power so that the network interface module receives electrical power while it is attempting to join the wireless network. Once the network interface module has joined the wireless network, the power control module allocates power so that the network interface module and the device interface module share electrical power.

DETAILED DESCRIPTION

Figure 1:
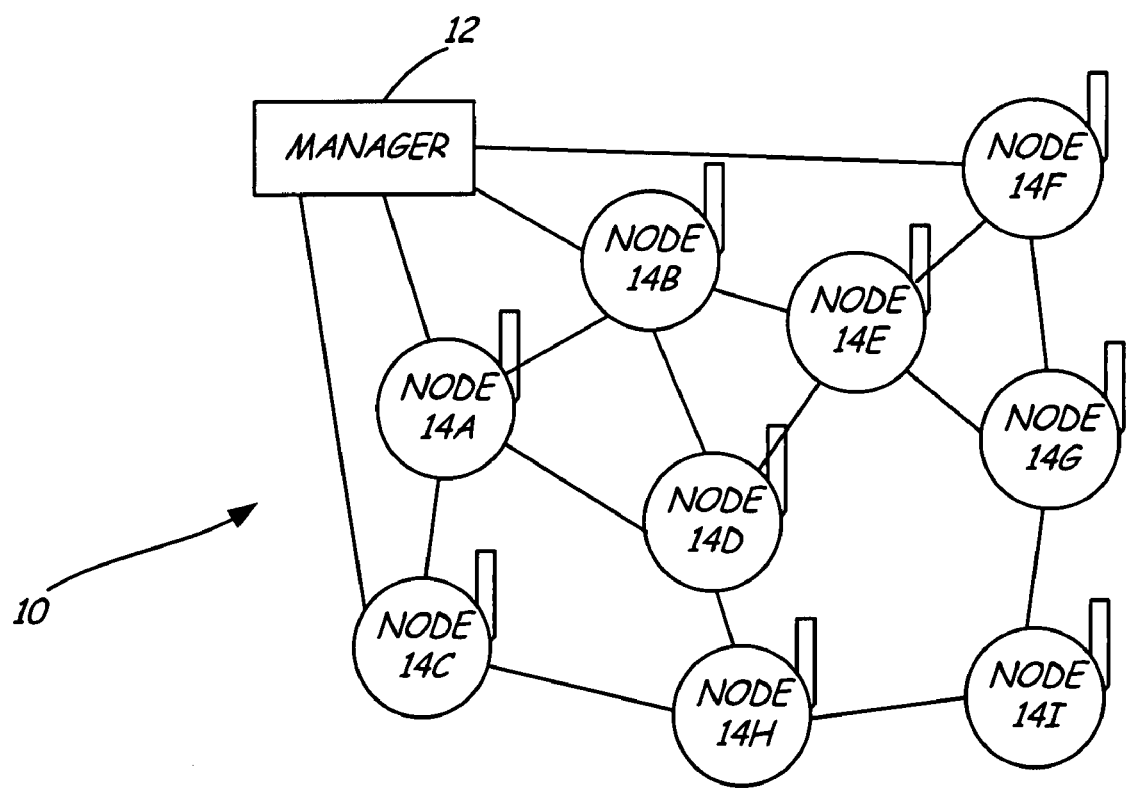
FIG. 1 is a diagram of a wireless mesh network that includes multiple field devices that define nodes of the network.

FIG. 1 shows self-organizing mesh network 10, which includes network manager 12 and individual devices or nodes 14A-14I. Self-organizing mesh network 10 is a wireless communications network in which individual devices 14A-14I pass data through multiple paths.

Network manager 12 may comprise, for example, a software application running on a network gateway or on a host computer. Network manager 12 can communicate directly (a single hop) with some of the devices (in this case devices 14A, 14B, 14C, and 14F) and can communicate indirectly (multiple hops) with the remaining devices.

According to one embodiment, when each of the devices 14A-14I joined network 10, network manager 12 preferably provided that device with a schedule to use in talking to other devices within network 10. Each device is provided with slots representing specific times and radio frequencies which they use to pass data to and from nearby devices that are either children or parents to that device.

In one embodiment, devices 14A-14I are field devices in a distributed industrial process system. The field devices may be transmitters having a sensor (or sensors) to monitor a process parameter such as pressure, temperature, flow rate, or fluid level. Alternatively, the field device may include an actuator for providing the control function in response to a control command signal received over network 10.

Figure 2:
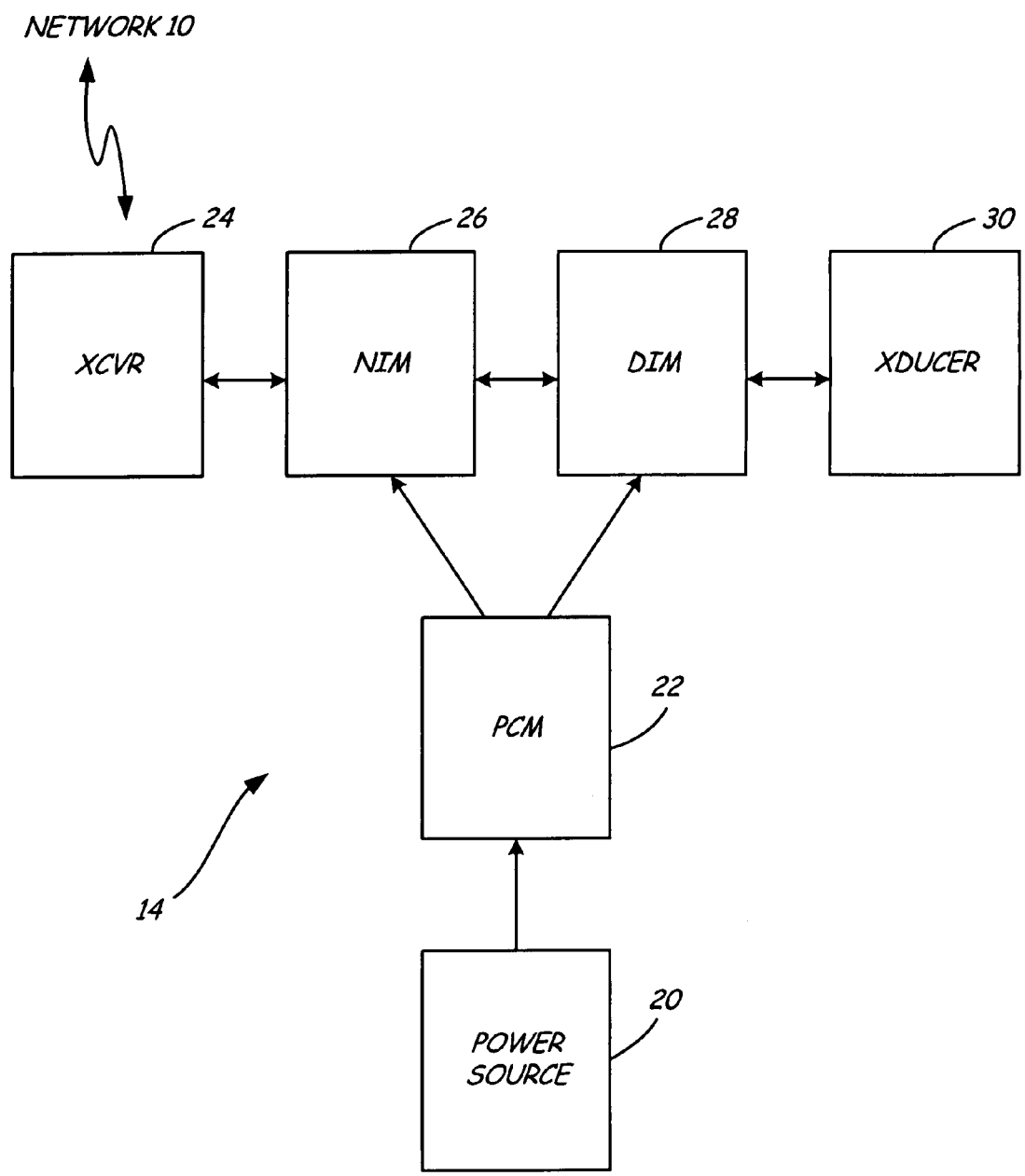
FIG. 2 is a block diagram showing a wireless field device representative of one of the nodes of the wireless mesh network of FIG. 1.

FIG. 2 shows a block diagram of node or field device 14, which may be representative of each of the individual devices 14A-14I. Device 14 includes power source 20, power control module (PCM) 22, transceiver 24, network interface module (NIM) 26, device interface module (DIM) 28, and transducer 30.

Power source 20 may be a battery, or a renewable energy source such as a solar cell, thermoelectric cell, atomic battery, or energy scavenger in conjunction with a storage capacitor. The effective lifetime of field device 14 depends upon the capacity of power source 20, and whether it is renewable or not.

Power control module 22 controls the distribution or allocation of energy from power source 20 to the other components of field device 14. In particular, power control module (PCM) 22 allocates power between the network communication functions performed by transceiver 24 and network interface module (NIM) 26, and the device functions performed by transducer 30 and device interface module (DIM) 28.

Transceiver 24 provides the wireless communication between device 14, and other similar devices within mesh network 10. In particular, transceiver 24 will receive control messages routed to it over network 10, will transmit responses to control messages based upon the actions of transducer 30 and DIM 28, and will relay messages to parent and children nodes as required by the mesh network communication protocol.

Network interface module (NIM) 26 controls the operation of transceiver 24. It processes the incoming messages received by transceiver 24, and it formats the outgoing messages to be transmitted by transceiver 24 through the mesh network. NIM 26 is also responsible for the joining process, in which device 14 joins and becomes a part of mesh network 10.

Transducer 30 may be a sensor or sensors for sensing a process parameter (such as pressure, temperature, flow, or fluid level). Transducer 30 may include additional sensors for sensing secondary parameters or variables that can also be reported over the wireless mesh network, or may be used by field device 14 in processing the measurement of the primary process parameter. For example, when the primary process parameter is pressure or flow, a temperature sensor may be used to provide a sensed temperature signal for correcting temperature dependence of the sensed primary parameter signal.

In other embodiments, transducer 30 may be an actuator that performs a mechanical function based upon a control input received over the mesh network. For example, transducer 30 may be a valve actuator used to control flow of a fluid in a process that is being controlled.

Device interface module (DIM) 28 provides the power to transducer 30 to perform the sensing or actuating function. When transducer 30 is a sensor, DIM 28 processes the sensor signal, and produces a sensor output that is provided to NIM 26 for transmission in a message over wireless mesh network 10. When transducer 30 is an actuator, DIM 28 provides the control or command input to the actuator based upon a message that has been received by transceiver 24 and provided to DIM 28 by NIM 26.

During normal operation, power control module (PCM) 22 allocates power from power source 20 between NIM 26 and DIM 28, so that both operation of transceiver 24 and operation of transducer 30 can occur. This sharing of power by NIM 26 and DIM 28 occurs so long as device 14 is a part of network 10.

When device 14 first joins network 10, as well as during times when communication has been lost and device 14 must reestablish contact with and rejoin network 10, consumption of power by DIM 28 and transducer 30 is not necessary. Power consumption by NIM 26 is at a maximum during a joining sequence, and then is lower during normal operation when network connection has been established. During the joining sequence, therefore, PCM 22 allocates the power only to NIM 26.

During a joining sequence, NIM 26 causes transceiver 24 to listen for transmissions from nearby devices that are part of network 10. Upon detecting the presence of one or more neighboring devices, NIM 26 causes transceiver 24 to send a handshake protocol message to the neighbors. Upon establishing communication with neighbors, NIM 26 sends a message to one of the neighbors asking to join the network. This message includes the device number and network ID of device 14. The neighbor then forwards the message asking to join the network to network manager 12, which performs a join authorization process and configures device 14 to network 10. Network manager 12 determines which neighboring devices will be parents and children of device 14, and establishes the network schedule for when transceiver 24 is to listen for messages directed to device 14, when it is to send messages, and on what channels transmission and reception should take place. This configuration of device 14 is performed through a series of configuration messages sent by network manager 12 to device 14.

The initial power requirement for NIM 26 to join network 10 is high and the join process may take a significant amount of time. As a result, the power needs of NIM 26 are high during the join process. All other power consumption is curtailed by PCM 22 during the join process, and all available power is allocated to NIM 26.

Once the joining process has taken place, NIM 26 will turn transceiver 24 on and off according to a network schedule provided by network manager 12. The duty cycle can be very low, with transceiver turned on for short periods when it is its turn to receive or transmit messages. In this way, transceiver 24 is not consuming power during time periods when no messages will be sent to or from device 14.

According to one embodiment, once NIM 26 has joined network 10, PCM 22 makes power available to DIM 28 as well as NIM 26. Each time that DIM 28 wakes up (e.g. in accordance with an internal time schedule of device 14, or in response to a message received by transceiver 24 and supplied by NIM 26 to DIM 28), DIM 28 will initiate a check to see whether NIM 26 is presently connected to network 10. If NIM 26 has not established a connection to network 10 through a join processes, or if communication with network 10 has been lost, NIM 26 will indicate that it is not connected to network 10. In that case, DIM 28 will be placed in a sleep mode, thereby substantially reducing its power consumption, and all available power will be allocated by PCM 22 to NIM 26 until NIM 26 has been successful in joining or rejoining network 10.

If NIM 26 indicates that it is connected to network 10, then DIM 28 is permitted to initiate operation of transducer 30. This may involve a sensor measurement, and signal processing of that sensor measurement by DIM 28. The processed sensor signal is then provided by DIM 28 to NIM 26 where it is stored until the sensor output can be provided in a message transmitted over the network.

When a message has been sent over the network containing a sensor output, an acknowledge signal may be sent back to device 14 indicating that the message containing the sensor output reached its destination. The acknowledge signal provides an indication to NIM 26 that NIM 26 is still active within the network. Similarly, control messages directed over network 10 to device 14 may request data such as the sensor output or operation of an actuator. Receipt of a control message also indicates to NIM 26 that it is still a part of network 10.

Figure 3:
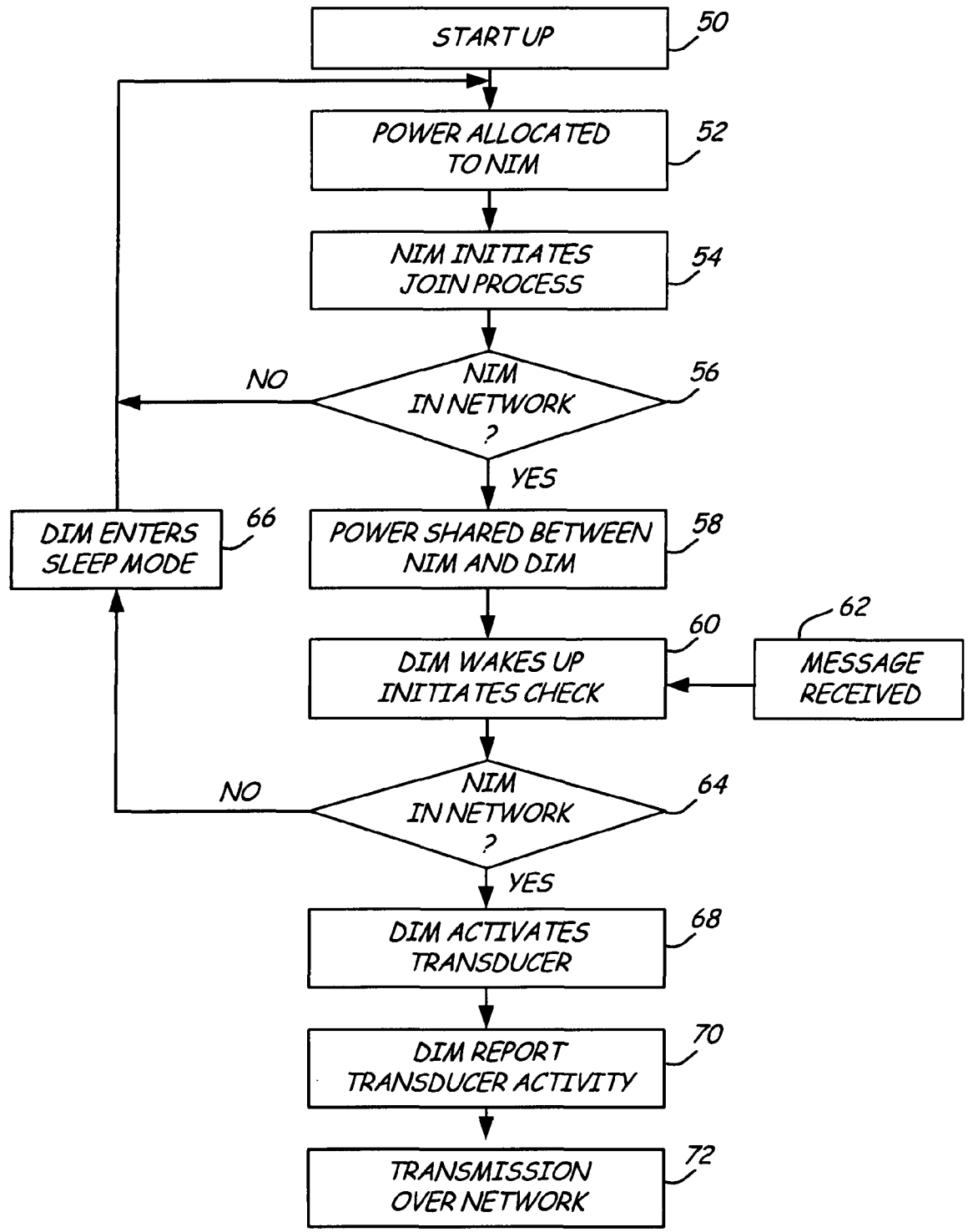
FIG. 3 is a flow diagram illustrating the control of power distribution to a network interface module and a device interface module of the wireless field device of FIG. 2.

FIG. 3 shows a flow diagram illustrating one embodiment of the power allocation within device 14. As shown in FIG. 3, operation begins with startup of device 14 (step 50). Upon startup, PCM 22 initially allocates power from power source 20 to NIM 26 (step 52). NIM 26 then initiates a joining process (step 54). Until the joining process has been successful and NIM 26 indicates that it is now in the network, power continues to be allocated substantially to NIM 26 (step 56) by PCM 22.

Once NIM 26 has completed the joining process and indicates that it is in network 10, PCM 22 then allocates power between NIM 26 and DIM 28 (step 58). DIM 28, whenever it becomes active, initiates a check of the status of NIM 26 (step 60). DIM 28 may be activated periodically according to an internal schedule of device 14, or may be activated in response to a message received over network 10 by transceiver 24 and NIM 26 (step 62).

Upon initiation of a check by DIM 28, PCM 22 determines whether or not NIM 26 is currently in network 10 (step 64). If NIM 26 is not in network 10, PCM 22 causes DIM 28 to enter a sleep mode (step 66). With DIM 28 in a sleep mode, power is once again allocated substantially to NIM 26 (step 52).

If NIM 26 indicates that it is connected to network 10, then DIM 28 activates transducer 30 (step 68). DIM 28 provides power to transducer 30 and either receives a sensor signal or signals, or causes an actuator to operate, depending on the type of transducer. DIM 28 then provides data to NIM 26 reporting the results of the transducer activity (step 70). This may be a sensor output derived by DIM 28, or may be feedback on the operation of an actuator.

NIM 26 stores the data from DIM 28 until the next time slot for transmission of data over network 10. NIM 26 formats the data received from DIM 28 into a message, and causes the message to be transmitted by transceiver 24 over the network at the appropriate time (step 72).

The power management of device 14 by PCM 22 separates power requirements for NIM 26 and DIM 28, and allows those power requirements to be satisfied in a sequence. This reduces the total power requirements whenever device 14 is joining wireless network 10. NIM 26 is provided with the power it needs to perform the joining process in order to establish connection to a wireless network. DIM 28 is inactive and not powered unless NIM 26 has joined the network.

The power management takes advantage of the reduced power requirement for NIM 26 after the joining process has taken place. Once NIM 26 is in normal network operation, DIM 28 can be powered up and used to operate transducer 30 as needed.

The power management process can be performed internally by device 14 using internal hardware, software or firmware.

Although the present invention has been described with reference to preferred embodiments, workers skilled in the art will recognize that changes may be made in form and detail without departing from the spirit and scope of the invention.

The invention claimed is:

1. A field device comprising:
   a network interface module for communicating over a wireless network;
   a device interface module for operating a transducer;
   a power control for determining how available electrical power is shared by the network interface module and the device interface module, wherein the power control is configured to monitor a network state of the network interface module and independently control allocation of power between the network interface module and the device interface module, wherein a portion of the available electrical power allocated to one of the network interface module and the device interface module is not available to the other of the network interface module and the device interface module; and
   software or firmware utilized by the power control that provides a power allocation priority sequence as a function of the monitored network state of the network interface module, wherein the power allocation priority sequence prioritizes allocation of power by the power control to the network interface module when the network interface module is not connected to the wireless network, regardless of status of the device interface module, and the device interface module has an increased share of available electrical power after the network interface module has joined the wireless network.

2. The field device of claim 1 and further comprising:
   a wireless transceiver for transmitting messages from the network interface module to the network and for receiving messages to the network interface module from the network.

3. The field device of claim 1 and further comprising:
a power source for providing electrical power.

4. The field device of claim 3, wherein the power source includes at least one of a battery, a solar cell, a thermoelectric cell, an atomic battery, an energy scavenger, and a storage capacitor.

5. The field device of claim 1, wherein the transducer includes at least one sensor or actuator.

6. The field device of claim 1, wherein the power control determines how available electrical power is shared so as to minimize total power consumption at any given time.

7. The field device of claim 1, wherein upon the device interface module waking up, the power control module determines whether to continue to allocate electrical power to the device interface module depending on whether the network interface is currently connected to the wireless network.

8. The field device of claim 1, wherein the wireless network is configured as a mesh network.

9. The field device of claim 1, wherein the joining process is defined as including one or more of: a search for existing network nodes, an establishment of a handshake protocol with a neighboring field device, a provision of a neighbor list addressed to a network manager, an implementation of configuration information from the network manager, and an establishment of one or more links in the wireless network from the field device.

10. A field device comprising:
a wireless transceiver for transmitting messages to and receiving messages from a wireless network;
a network interface module for controlling operation of the wireless transceiver;
a transducer;
a device interface module for controlling operation of the transducer;
a power source;
a power control module configured to monitor a network state of the network interface module and independently control allocation of power between the network interface module and the device interface module;
software or firmware utilized by the power control module that provides a power allocation priority sequence as a function of the monitored network state of the network interface module, wherein the power allocation priority sequence prioritizes allocation of power by the power control module to the network interface module when the network interface module is not connected to the wireless network, regardless of status of the device interface module.

11. The field device of claim 10, wherein the power control module allocates all available power to the network interface module except for sleep mode power allocated to the device interface module by the power control module when network connection to the wireless network has not been established.

12. The field device of claim 11, wherein the power control module allocates power when network connection to the wireless network has been established so that both the network interface module and the device interface module receive power.

13. The field device of claim 10, wherein the network interface module controls power to the transceiver, and the device interface module controls power to the transducer.

14. The field device of claim 10, wherein the power source includes at least one of a battery, a solar cell, a thermoelectric cell, an atomic battery, an energy scavenger, and a storage capacitor.

15. The field device of claim 10, wherein the transducer includes at least one sensor.

16. The field device of claim 10, wherein the transducer includes an actuator.

17. The field device of claim 10, wherein when the device interface module wakes up, the power control module determines whether the network interface module has an established network connection.

18. The field device of claim 10, wherein the power control module allocates a greater portion of the power to the network interface module when a network connection is not established than when a network connection is established.

19. The field device of claim 10, wherein the wireless network is configured as a mesh network.

20. A method of operating a field device including a power source, a wireless transceiver, a transducer, a network interface module and a device interface module, the method comprising:
determining whether the network interface module is connected to a wireless network through the wireless transceiver;
monitoring the determination of whether the network interface module is connected to the wireless network through the wireless transceiver with a power control module that governs power allocation between the network interface module and the device interface module;
establishing a power allocation priority schedule as a function of the monitored determination of whether the network interface module is connected to the wireless network through the wireless transceiver, wherein the power allocation priority schedule prioritizes allocation of power to the network interface module when the network interface module is not connected to the wireless network, regardless of status of the device interface module; and
allocating available power from the power source independently between the network interface module and the device interface module with the power control module based upon the monitored determination of whether the network interface module is connected to the wireless network and the power allocation priority schedule, wherein a portion of the available electrical allocated for one of the network interface module and the device interface module is not available to the other of the network interface module and the device interface module.

21. The method of claim 20, wherein allocating power comprises:
allocating all available power to the network interface module except for sleep mode power allocated to the device interface module when the network interface module is not connected to the wireless network; and
allocating power to both the network interface module and the device interface module for waking operation when the network interface module is connected to the wireless network.

22. The method of claim 20 and further comprising:
powering the wireless transceiver with power from the network interface module; and
powering the transducer with power from the device interface module.

23. The method of claim 20, wherein determining whether the network interface module is connected to the wireless network occurs when the device interface module wakes up.

* * * * *